United States Patent [19]

Marshall

[11] Patent Number: 4,652,730
[45] Date of Patent: Mar. 24, 1987

[54] METHOD AND APPARATUS FOR SKEW COMPENSATION IN AN OPTICAL READER

[75] Inventor: J. Nathaniel Marshall, Boston, Mass.

[73] Assignee: Honeywell Information Systems Inc., Waltham, Mass.

[21] Appl. No.: 688,657

[22] Filed: Jan. 3, 1985

[51] Int. Cl.$^4$ .............................................. G06K 7/00
[52] U.S. Cl. .................................... 235/436; 235/456; 235/470; 369/47
[58] Field of Search ....................... 235/436, 456, 470; 369/46, 47

[56] References Cited

U.S. PATENT DOCUMENTS 4,147,295 4/1979 Nojiri et al. ..................... 235/470 X
4,308,557 12/1981 Dieterich ........................ 369/47 X
4,357,596 11/1982 Feilchenfeld ....................... 235/436

Primary Examiner—David L. Trafton
Attorney, Agent, or Firm—George Grayson; John S. Solakian; William A. Linnell

[57] ABSTRACT

A method and apparatus for skew compensation in an optical reader is described. The method provides for calculating the amount of skew between the read scan line used to read the data and the recording path line used when the data was written on the recording media. By determining the position of each end of the scan line by counting delimiter marks along the two edges of the data being read, the skew can be calculated by determining the difference in delimiter counts. The data is divided into bands along the direction of scan within which the skew will not cause trouble misreadings at the extreme bits of the scan line within a band. The data is scanned multiple times during the transition of the data strip so that at least one good read of each data band in the data strip will occur.

12 Claims, 9 Drawing Figures

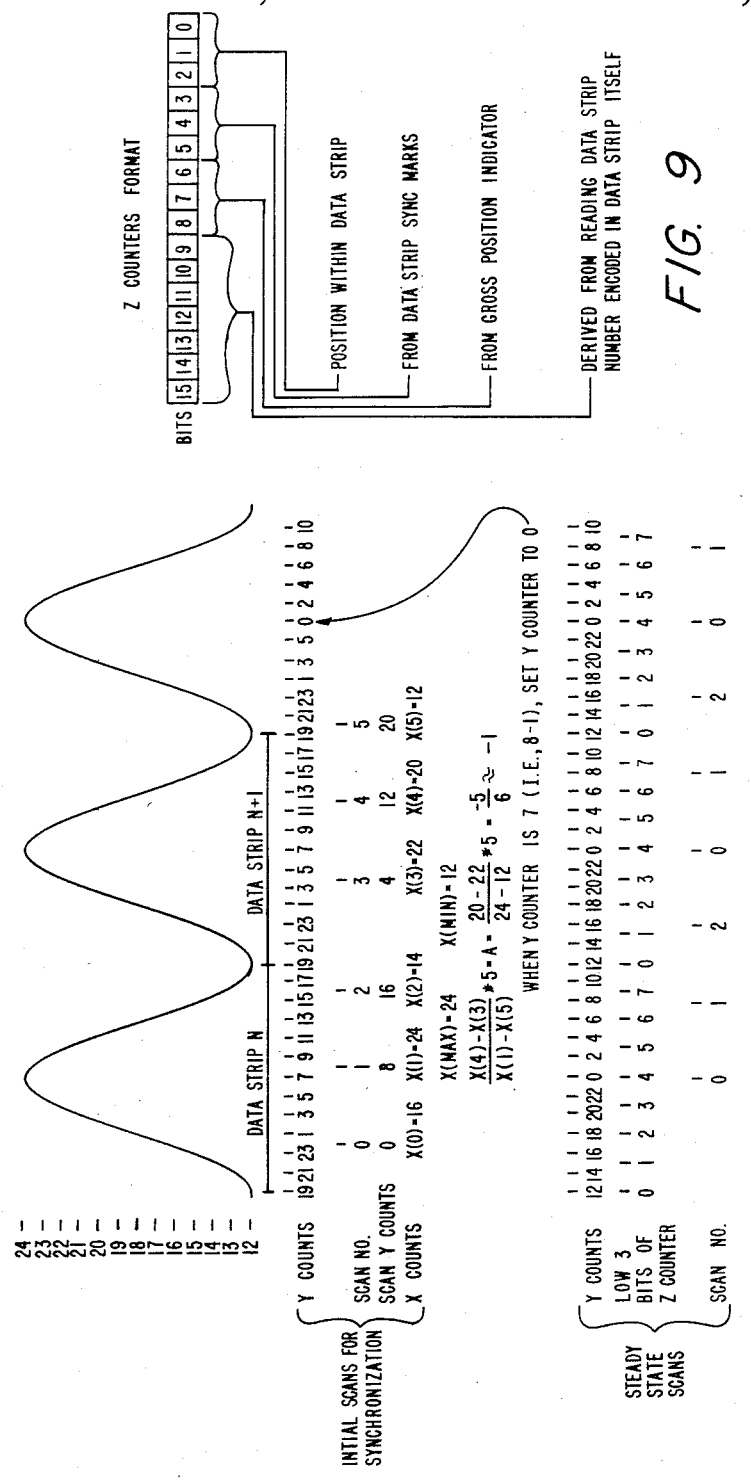

METHOD AND APPARATUS FOR SKEW COMPENSATION IN AN OPTICAL READER

BACKGROUND OF THE INVENTION

1. Field of the Invention

The method and apparatus of the present invention generally relates to a method for reading optically recorded data and, more particularly, to a method for compensation for the skew between the scan line of the sensor used to read the recorded data and the recording path line of the data.

2. Description of the Prior Art

Digital information can be recorded using available technology to either burn or not burn small holes in a reflective surface. The information, so written, can be retrieved by detecting the presence or absence of these small holes as the reflective surface is scanned by a reading element. Current technology makes it possible to achieve very high information densities in the order of 200 million dots per square inch. When information is stored on disks which are read when the disks are rotating, the information is usually recorded in circular tracks one dot wide so that at any moment only a single dot is being scanned when the information is being read back from the disk. On optical disks, these circular tracks are selected and sectors are read using techniques that are similar to those used for reading magnetic disks. The high rotational speed of the optical disk combined with the high density of the information in a track produces high data transfer rates when the information is read.

If the same general optical recording technology is applied to tape or data cards, such as credit cards having a strip of optically recorded data, it would be advantageous to be able to scan across the optical media as is done with magnetic tape devices in data processing systems. One such data card having an optical media is described in U.S. Pat. No. 4,360,728, which is incorporated herein by reference.

FIGS. 1 and 2 illustrate such a data card in which card 10 is to have a size common to most credit cards. The width dimension of such a card is approximately 54 mm and the length dimension is approximately 85 mm. These dimensions are not critical, but preferred because such a size easily fits into a wallet and has historically been adopted as a convenient size for automatic teller machines and the like. The card's base 11 is a dielectric, usually a plastic material such as polyvinyl chloride, polycarbonate or similar material. The surface finish of the base should have low specular reflectivity, preferably less than 10%. Base 11 has a shallow groove which carries strip 12. This strip 12 is about 16 millimeters wide and extends the length of the card. The strip is relatively thin, approximately 100–500 microns, although this is not critical. The strip may be applied to the card by any convenient method which achieves flatness. The strip is adhered to the card with an adhesive and covered by a transparent laminating sheet 13 which serves to keep strip 12 flat, as well as protecting the strip from dust and scratches. Sheet 13 is a thin, transparent plastic sheet laminating material or a coating, such as a transparent laquer.

The opposite side of base 11 may have user identification indicia embossed or printed on the surface of the card. Other indicia such as card expiration date, card number and the like may be optionally provided.

The high resolution optical recording material which forms strip 12 may be any of the reflective recording materials which have been developed for use as direct read-after-write (DRAW) optical disks, so long as the materials can be formed on this substrate. An advantage of reflective materials over transmissive materials is that the read/write equipment is all on one side of the card and automatic focus is easier.

With reference to FIG. 3, a magnified view of laser writing on the optical recording strip 12 may be seen. The dashed line 14 corresponds to the dashed line 14 in FIG. 1. The oblong pits 15 are aligned in a path (track) and are generally circular or oval in shape with the axis of the oval parallel to the lengthwise dimension of the strip. A second group of pits 16 is shown aligned in a second track. The pits 16 have similar dimensions to the pits 15. The spacing between tracks is not critical, except that the optics of the readback system should be able to easily distinguish between tracks.

Presently, in optical disk technology, tracks which are separated by only a few microns may be resolved. The spacing and patterns of the pits along each track is selected for easy decoding. For example, oval pits of the type shown can be clustered and spaced in accordance with self-clocking bar codes. If variations in the dimensions of a pit are required, such dimensions can be achieved by clustering pits. The pits illustrated in FIG. 3 have a size of approximately 5 microns by 10 microns and are spaced apart within the track and between tracks.

One difficulty with scanning across the media in tape or data cards is the problem of skew between the track of the recorded data and the reading scan line. The very high packing densities achievable with optical technology make this problem acute. For example, if 5 by 10 micron pits were used to record data across a ½ inch tape, the maximum skew allowable between the path used when the data was written and the path of the scan used to read the data is less than one-twentieth (1/20) of a degree. This is illustrated in FIG. 4 which shows the skew angle between the path used to record the data and the path used to scan the data when it is being read. This problem becomes more acute for data cards because the desire to have a low cost reader limits the ability to correct for skew by positioning the card or read mechanism to align the recorded data with the reader.

Therefore, what is needed is a low cost method to correct for skew when reading optically recorded data.

OBJECTS OF THE INVENTION

Accordingly, it is an object of the present invention to provide a method for detecting and compensating for skew between the path used to record data and the path used to scan data while reading recorded data.

It is another object of the present invention to provide means for correcting for skew during the transverse scanning of recorded data which can be performed by a program in a microprocessor and some simple digital logic circuits.

It is a further object of the present invention to provide a means for correcting for skew during transverse scanning of the recording media without requiring the mechanical alignment of the recorded data with the read scan line.

It is a yet further object of the present invention to provide a method which extends the length of transverse scans of recorded data can be performed without requiring the mechanical alignment of the recorded data with the reading device.

It is a still further object of the present invention to provide a low cost method and apparatus to correct for skew when reading optically recorded data.

This invention is pointed out with particularity in the appended claims. An understanding of the above and further objects and advantages of this invention can be obtained by referring to the following description taken in conjunction with the drawings.

SUMMARY OF THE INVENTION

The method of the present invention compensates for skew between the recording path used to record data on a media and the scan line of the reader used to scan the data when reading back the recorded data is comprised of the following steps. The data is recorded in data strips that are more or less perpendicular to the lengthwise axis of the recording media. The recorded data is scanned transversely with a scanner at a rate sufficient for the worst case rate of the recording media relative to the read scan line. The position of the read scan line is established by determining the position of both ends of the read scan line by counting delimiter marks along the two edges of the data being read (scanned) which are spacially related to the data strips and have an accuracy better than ¼ of a data strip. The difference between the counts is a measurement of the skew. The data is divided into bands along the direction of scan within which the skew will not cause troublesome misreadings of the extreme bits of the read scan line within a band. The data is scanned a plurality of times during the transition of the data strip. The determination of which bands of a scan are centered well enough for correct read out is determined by the difference of the delimiter marks counts at the two ends of the read scan line and the use of error detecting codes. The data from different bands are entered sequentially into individual buffers in a memory so that entries from the band where the read scan line is most advanced are entered at a higher location than the data from the least advanced band on the opposite end which is placed in a lower location. Data from intermediate memory bands is placed in intermediate locations. The buffers in memory can then be read to give data as it is sequenced in the data strip or as it is sequenced alond the bands. The motion of the reader may be accomplished by moving the recording's media relative to the reader, the reader relative to the recording media, by optically scanning the recording media by use of moving a mirror or a combination of these means.

BRIEF DESCRIPTION OF THE DRAWINGS

The manner in which the method of the present invention is performed and the manner in which the apparatus of the present invention is constructed and its mode of operation can best be understood in light of the following detailed description together with the accompanying drawings in which like reference numbers identify like elements in the several figures and in which:

FIG. 8 is a diagram of the relationship between the sinusoidal wave of the delimiter bands and the Y and Z counters and the 3 scans that occur per data strip.

FIG. 9 is a diagram of the various bits of the 16-bit Z counter used by the present invention to calculate which data bands are positioned under the read head so as to be capable of being read without error due to skew.

DESCRIPTION OF THE PREFERRED EMBODIMENT

Figure 1:
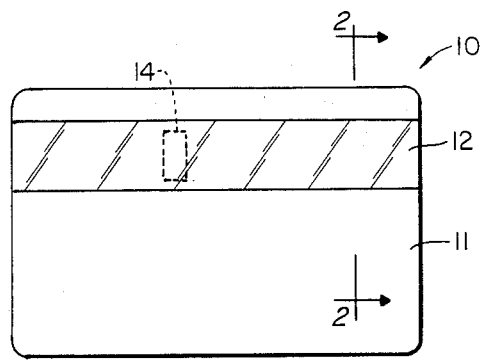
FIG. 1 is a plain view of one side of a prior art data card capable of being read in accordance with the present invention.
Figure 2:
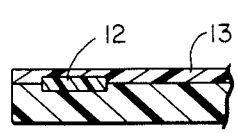
FIG. 2 is a partial side sectional view taken along lines 2—2 in FIG. 1.
Figure 3:
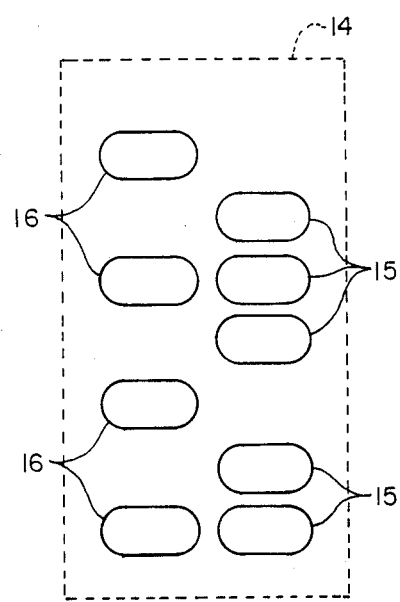
FIG. 3 is a detail of laser writing on a portion of the optical recording strip illustrated by dashed lines in FIG. 1.
Figure 4:
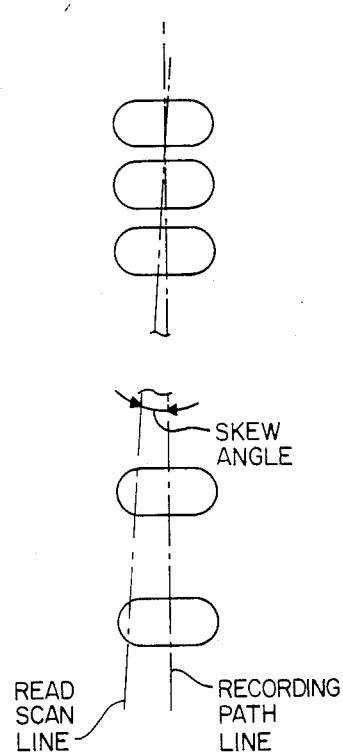
FIG. 4 illustrates the skew angle between the path used to record data on the data card of FIG. 1 and the scan line used to read the recorded data.

There are several methods for dealing with the skew between the read scan line and the recording path line. One such method is to keep the length of the read scan line short so that the worst case skew can be tolerated. This method has the disadvantage that in order to completely scan a wide optical recording strip, multiple scans must be made by either providing multiple scanning mechanisms or a single scanning mechanism and a means by which the scan can be shifted relative to the optical recording strip. Using this method, one scan can read one of a plurality of bands across the width of the optical recording strip.

A second method is to scan the optical recording strip at a rate compatible with detection and correction of the skew. Using this method, miss orientation between the recording path line and the read scan line can be corrected by either slight changes in position of the card or by slight changes in position of the scanning mechanism.

A still further method for correcting this skew problem is to make multiple scans of each recorded data strip and to identify which portions of each scan are producing valid data and to use only those valid portions. It is this latter method that is used by the present invention.

The present invention corrects for skew when reading optically recorded data from a card or tape in a way particularly suitable to low cost technologies by using multi-element charge coupled device linear image sensors (also referred to as linear CCD scanners) and microprocessors. In the preferred embodiment, the method of the invention is based on the following steps:

1. The data is recorded in data strips that are more or less perpendicular to the lengthwise axis of the optical recording strip of a card or tape.

2. The recorded data is scanned transversely with a CCD scanner at a rate sufficient for the worst case rate of motion of card or tape relative to the read scan line. The card or tape is moved mechanically under the CCD scanner with a smooth motion and means to hold it against an edge which acts as a reference.

3. The position of the read scan line is established by determining the position of both ends of the scan line by counting delimiter marks along the two edges of the data being read (scanned) which are spacially related to the data strips and have an accuracy of better than ¼ of a data strip. The difference between the counts is a measurement of the skew.

4. The data is divided into bands along the direction of scan within which the skew will not cause troublesome misreadings of the extreme bits of the scan line within a band.

5. The data is scanned more than once during the transition of the data strip. The determination of which bands of a scan are centered well enough for correct read out is determined by the difference of the delimiter mark counts at the two ends of the scan line and the use of error detecting codes.

6. The data from different bands are entered sequentially into individual buffers in a memory so that entries from the band where the read scan line is most advanced are entered at a higher location than the data from the least advanced band on the opposite end which is placed in a lower location. Data from intermediate memory bands is placed in intermediate locations.

7. The buffers in memory can then be read to give data as it is sequenced in the data strip or as it is sequenced along the bands.

Figure 5:
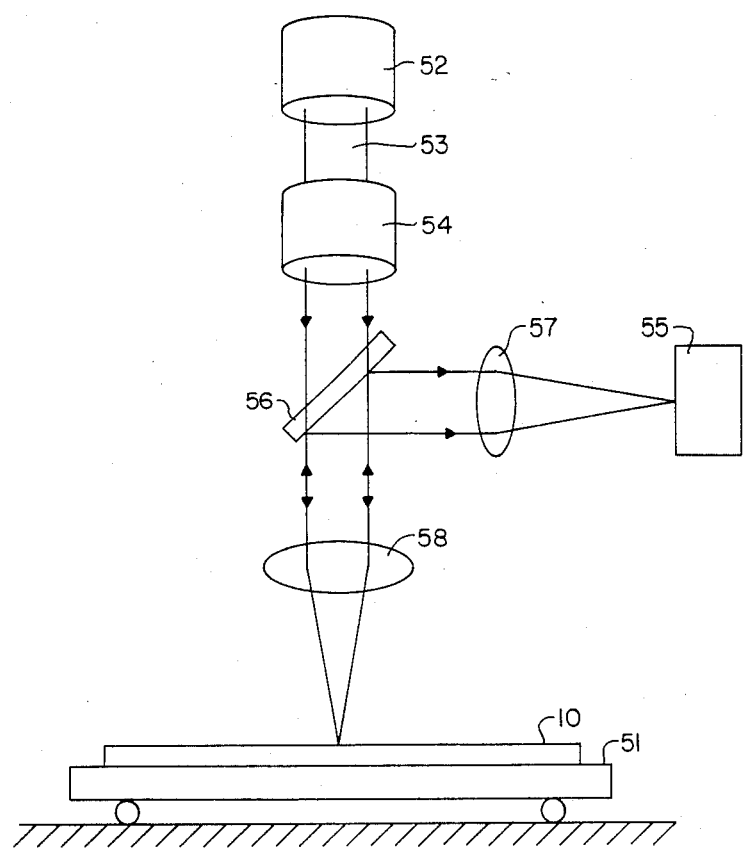
FIG. 5 is a side view of an apparatus for reading the optical recording strip of the data card of FIG. 1 capable of being used with the present invention.

FIG. 5 illustrates an apparatus for reading a recorded data card. In FIG. 5, a side view of the lengthwise dimension of a card 10 is shown. The card is received in a movable holder 51 which brings the card into the illuminating beam trajectory. A laser light source 52 emits a beam 53 which passes through collimating and focusing optics 54.

In order to access data on a card record in less than a second, which is a common requirement, the combination of physical motion to the data strip containing the data and then the scan along the data strip to the desired data band must be around one half second. If the time to reach a data strip is much over a half second, this will become impossible. If slower than this, there must be two speeds to the motion, seek and read. Therefore, an appropriate position finding mechanism is used to control seeking when the traverse is too rapid to permit regular scanning because reading speed is limited to around 1 M bit per second and there are 5,000–10,000 data strips on the card each having 1320 bits. Because the data strip contains more than 100 bits, a two speed card positioning operation is required for a full transverse scan of the 16 mm. data strip film width. A two speed motor with a gross and fine data strip locating schemes is used. During the high speed seek motion, the gross position bands are used to locate within one of 8 data strips of the desired data strip. Once the card is positioned by use of the gross positioning bands, the slower read speed is invoked and a full scan of the data strip is used to locate the desired data strip by counting the data strip sync marks within the upper and lower delimiter bands of the optical data strip.

Control of the lengthwise position of the card relative to the beam is achieved by motion of movable holder 51. During reading, this motion must be smooth and within a few percent of a specified velocity. A simple motor and tachometer should do this at the required reading speed of about 3.3 mm. This reading speed is based upon performing 1 scan/ms. and 3 scans per data element (data strip) which means 333 data strips will be scanned per second and a data strip is 10 microns wide yielding a read speed of 3.33 mm. per second. To reach the read zone containing the decided data, a rapid motion of about 3 or more inches per second can be used. The gross position bands, described later, provide information for control of the high speed motion used to establish an initial read position of the card beneath the read illuminating beam. The motor moves holder 51 lengthwise so that consecutive parallel data recording paths (data strips) that are more or less perpendicular to the lengthwise axis of the optical recording strip on the card can be read as the card moves under the read illuminating beam. As light is scattered and reflected from the pits in the optical recording media, the reflectivity of the spot being read changes relative to surrounding material where no pits exist. After passing through beam splitter 56, the illuminating beam is focused into a slit of light perpendicular to the lengthwise axis of optical recording strip on card 10 by focusing lens 58.

Differences in reflectivity between a pit and surrounding material are detected by light detector 55 which, in the preferred embodiment, is a multi-element charge coupled device linear image sensor. Light is focused onto detector 55 by beam splitter 56 and focusing lens 57. The detector 55 produces electrical signals correponding to pits. These signals are processed by the present invention to develop the information recorded on the card.

A wallet sized card such as described in U.S. Pat. No. 4,360,728 can be used as a starting point. Similar recording techniques are used but the dimensions can be different, particularly with respect to the width of the optical recording strip.

The preferred embodiment described below can be used to scan across a full strip of optical recording material, for example 16 mm, or it can simply extend the scan 2 to 4 times over that which would be permitted without any skew correction. For recorded data marks approximately 10 microns across, this is about 0.5 mm for about 0.7 degrees of skew. The present invention is applicable to CCD scanners in read only applications or a laser diode and galvanometer scheme for read-write applications. The method requires that each transverse data strip be scanned several times so that a random relationship between the reads and the data will still assure at least one good read. Three reads per data strip is used in the preferred embodiment to ensure one good read of the data.

The basic approach is to divide the data strip into bands which are readable without skew correction and to make a separate determination for each band as to the validity of the data from that portion of the scan. The preferred embodiment requires satisfaction of an error detecting code and a measured position near the middle of the data strip (for that band) which is determined by watching synchronization marks at the two ends of the data strip.

Figure 6:
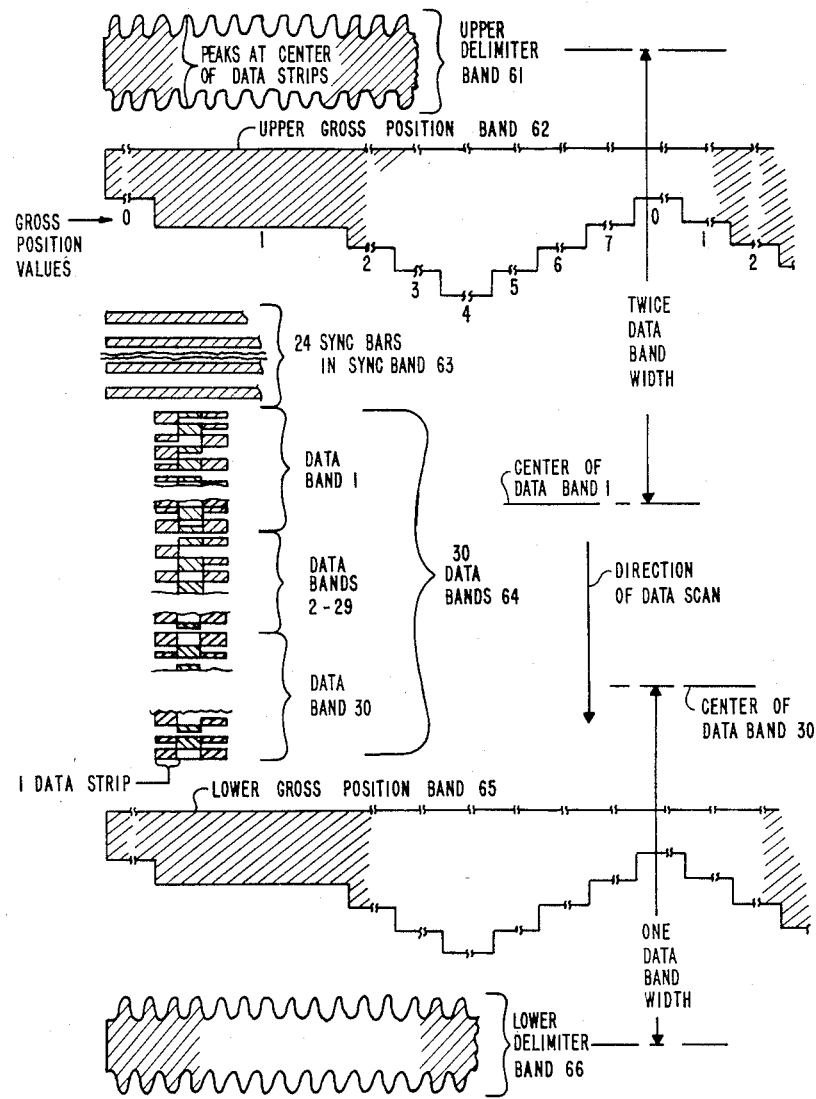
FIG. 6 is a top view of the optical recording strip of the data card of FIG. 1 showing the delimiter, positioning, synchronizing and data bands which are read by the present invention.

The various bands recorded in the optical recording strip and which make up a single data strip are shown in FIG. 6. A data strip is composed of an upper delimiter band 61, an upper gross position band 62, a sync band 63, thirty data bands 64, lower gross position band 65, and lower delimiter band 66.

The delimiter bands 61 and 66 are 80 microns wide with sinusoidal data strip synchronization marks on each edge with an amplitude of 20 microns making one complete cycle per data strip such that the delimiter bands alternate between a maximum of 80 microns of dark to a minimum of 40 microns of dark within each data strip. The middles of delimiter bands 61 and 66 are integral number of data band widths away from the middles of data bands 64 to simplify calculations of data band locations. The middle of upper delimiter band 61 is 968 microns (twice the data band width) from the middle of the first data band of data bands 64. The middle of lower delimiter band 66 is 484 microns (one band width) from the middle of the last data band of data bands 64. The sinusoidal data strip synchronization marks of delimiter bands 61 and 66 are used to determine in which data strip the end of the scan line is located and the scan line relative position within a data strip.

The gross position bands 62 and 65 vary in the width of their dark area from a minimum of 40 microns to a maximum of 120 microns in 20 micron steps with each step occurring each 8 data strip widths (i.e., every 80 microns). These position bands are used to determine the position of the read scan line within one of eight groups of eight data strips. The delimiter bands are separate from the gross position bands by 27 microns of light area.

Sync band 63 is composed of 24 synchronization bars of 11 microns of dark separates by 11 microns of light. These 24 synchronization bars are used to synchronize the data clock at the start of a scan of a data strip which begins at the upper edge and progresses to the lower edge. The sync band 63 is separated from the upper gross position band by 11 microns of light area.

In the preferred embodiment, data is recorded using a modified frequency modulation (MFM) method, a recording element space (i.e., the space occupied by one bit of data) is 10 microns wide (the width of a data strip) in the direction perpendicular to the scan line and 11 microns along the scan line. A binary ZERO is represented by either a dark or light recording element. A binary ONE is represented by a transition in the recording element space and 5.5 microns is dark and 5.5 microns is light in the direction of the scan line.

Within each data band of data bands 64 in the data strip, there are 32 data bits, 4 transverse parity bits and 8 longitudinal parity bits for a total of 44 bits in a length of 484 microns.

The 30th (last) data band of data bands 64 is separated from lower gross position band 65 by 55 microns of light so that the middle of lower delimiter band 66 is an integral number of data band widths from the middle of the data bands.

The length of a data strip is: upper delimiter band 61 width (80 microns) plus separation width (27 microns) plus upper gross position band 62 width (120 microns) plus separate width (11 microns) plus sync band 63 width (528 microns) plus thirty data band 64 widths (30×484 microns=14520 microns) plus separation width (55 microns) plus lower gross position band 65 width (120 microns) plus separation width (27 microns) plus lower delimiter band 66 width (80 microns) yielding a total of 15568 microns or approximately 15.7 mm. This total leaves margins of approximately 0.15 mm. on each side of a 16 mm. optical recording strip.

Figure 7:
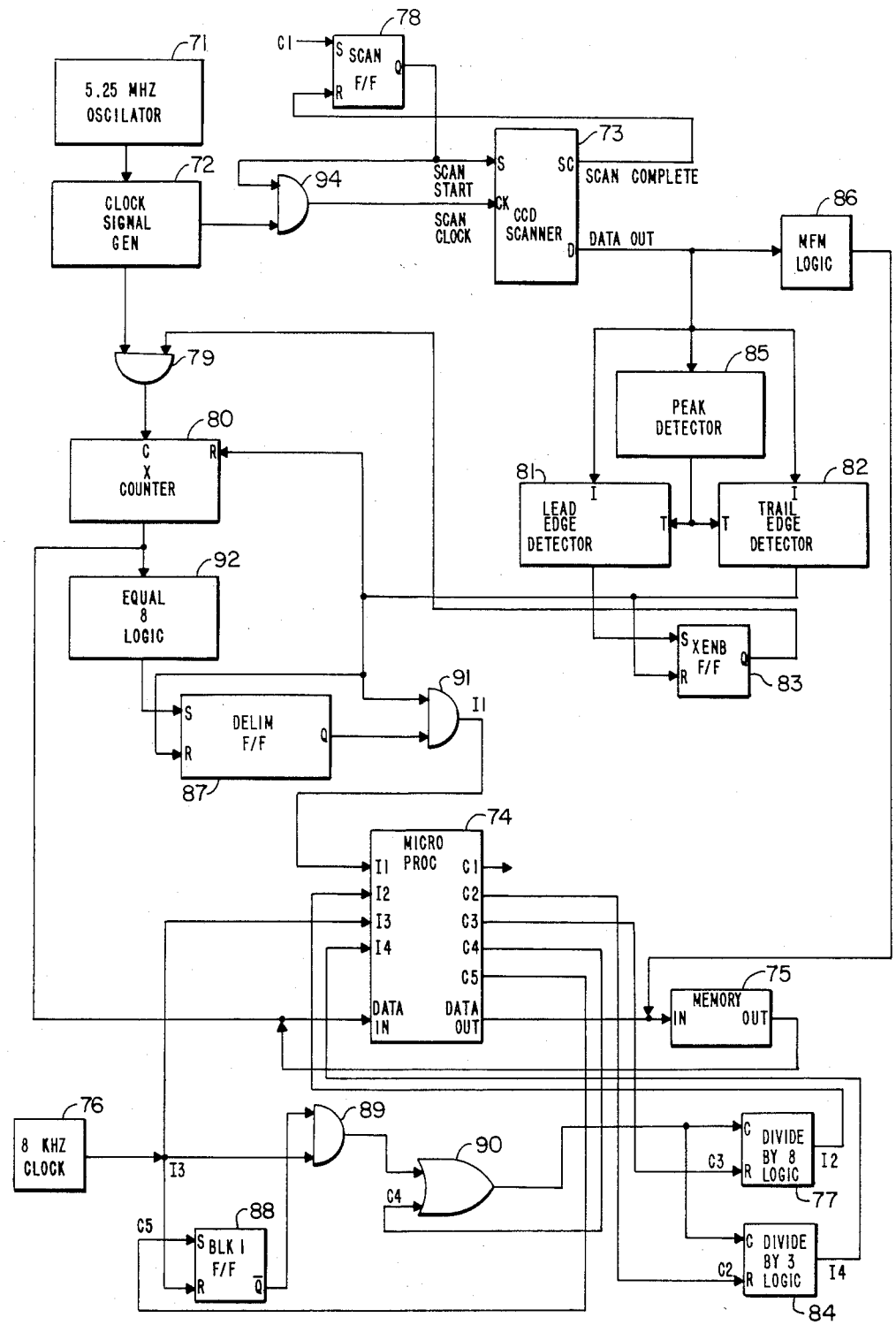
FIG. 7 is a logic block diagram of logic for reading data from an optical card recorded by using the format of FIG. 6.

FIG. 7 illustrates in block diagram the logic for reading data from an optical recording strip recorded using the format of FIG. 6.

The main elements in the logic of FIG. 7 are CCD scanner 73 which is used to scan the data optically recorded on a card, microprocessor 74 which is used to control the logic by generating commands C1 through C5 in response to interrupts I1 through I4, memory 75 which contains the microprogram executed by microprocessor 74 and which holds various counters and the data read for the data card and modified frequency modulation logic 86 which processes the analog output signal of CCD scanner 73 into a digital output signal corresponding to the image scanned from the data card.

The CCD scanner 73 in FIG. 7 corresponds to detector 55 in FIG. 5. CCD scanner 73 of the preferred embodiment is assumed to have operating characteristics which correspond to Fairchild Semiconductors, a Division of Fairchild Camera and Instrument Corporation, part number CCD121 solid state linear image sensor which has 1728 sensing elements (pixels) and is described in their Preliminary Data Sheet, dated January 1975, which is incorporated herein by reference.

In FIG. 7 basic clock 72 drives the scanning of the CCD scanner 73. Since there is a redundancy of about 9:1, the clocking rate is high, at least several MHZ. The redundancy is due to the use of 3 scans to assure one good read and the use of 3 CCD pixels/recorded data elements (i.e, bits) to make it a quasi analogue reading, which avoids exact relationshps between CCD pixels and data elements which would be almost impossible to achieve. Therefore, oscillator 71, having a 5.25 megahertz frequency, is used as input to clock signal generator 72. The 5.25 MHZ output signal of clock 72 assures that one scan of CCD scanner 73 having 5,000 image sensor elements (available from Toshiba) can be completed in a little under one millisecond.

In order to make clear the range of capabilities of the present invention, an embodiment having a long data strip across the full width of a 16 mm film will be described. CCD scanner 73 must have about 5,000 image sensor elements (pixels) in order to obtain 3 samples for each of 1,320 data elements and to allow for the delimiter, gross position and synchronizing bands and tracking errors. With one percent (1%) tolerance for film size, scanner image size (lens and scanner element) and scanner positioning relative to the film a total tolerance plus or minus 2 percent (2%) will allow about 3.3 pixels per data element. If more are needed, the data element capacity of a data strip can be reduced.

As the optical recording strip is scanned transversely to its long axis by the CCD scanner, the first mark detected is the upper delimiter band 61. The width of the delimiter bands 61 and 66, varies from 40 to 80 microns from valley to peak of the sinusoidal wave form. The number of CCD pixels to traverse a delimiter band will vary from approximately 12 to 24 pixels. A threshold value is set at half the analog pixel signal amplitude seen in this mark and used to enable a counter. This is done by peak detector 85 detecting the highest analog output signal from the data (D) output of CCD scanner 73. The output of peak detector 85 is used to set the threshold for leading edge detector 81 and trailing edge detector 82 at their T inputs and is compared against the data input singals at their I inputs. Leading edge detector 81 outputs a signal which becomes a binary ONE when the scanner outputs a signal which is less than the threshold, indicating that a scanner pixel saw a dark spot on the data card. Trailing edge detector 82 outputs a signal which becomes a binary ONE when the scanner outputs a signal which is greater than the threshold, indicating that a scanner pixel saw a light spot on the data card. A binary ONE from leading edge detector 81 is used to set the X enable flip-flop 83 and a binary ONE from trailing edge detector 83 is used to reset X enable flip-flop 83. As long as X enable flip-flop 83 is set, the Q output signal will be a binary ONE and partially enable AND gate 79 thereby enabling X counter 80 to count the number of consecutive dark pixels seen by CCD scanner 73 by counting the number of clock signals that occur between a dark leading edge of a spot on the card and the light trailing edge of the same spot. X counter 80 is a 6-bit counter which is reset to zero by a signal at its reset input which occurs each time trailing edge detector 82 detects a light scanner pixel. Before being allowed to reset this count for upper delimiter band 61 is stored in the microprocessor memory 75 in response to interrupt signal I1 from delimiter flip-flop 87 via AND gate 91. A similar process occurs later for lower delimiter band 66. Delimiter flip-flop 87 is set by a binary ONE from equal 8 logic which produces a binary ONE at its output whenever the count in X counter 80 is equal to eight.

The only time CCD scanner 73 should encounter 8 or more consecutive dark pixels in a scan across a data strip is in delimiter bands 61 and 66 and gross positions bands 62 and 65. Delimiter flip-flop 87 will remain set until reset by a binary ONE signal from trailing edge detector 82 indicating the trailing edge of a dark spot on the card. If delimiter flip-flop 87 is set when the trailing edge occurs, indicating one of 4 bands has been scanned, the binary ONE from trailing edge detector 82 will partially enable AND gate 91 and cause interrupt I1 to microprocessor 74 which will read into microprocessor 74 the value of the X counter which equals the number of pixels in the band. This reading of the counter occurs before the X counter 80 is reset. The upper delimiter band 61 and lower delimiter band 66 X counts are stored in three location buffers for successive scans on a simple rotation basis. These X counts are used to determine the minimum and maximum widths of the delimiter band sinusoidal data strip sync marks.

The second mark which the scan crosses is the upper gross position band 62 and is used for correcting the bits 6 to 8 of the data strip count in the Z counters (see below) when reading is initiated after a rapid movement of the card to a reading area. It can also be used to locate a reading area. The X counter is again used to measure the gross position band width and the values are stored next to the upper delimiter band width in memory 75. Values of the X counter for the gross position band will vary roughly from 12 to 36 as the gross position band varies from 40 to 120 microns in width in 20 micron steps (see FIG. 6).

For convenience in control and calculation, a basic Y counter with 24 steps per data strip is used for time synchronization, scan initiation and to drive the upper and lower data strip position counters called Z counters. The format of the Z counters is shown in FIG. 9. These Z counters are stepped 8 times (counts of 0 to 7) per data strip which makes calculation of effective Z counts for each band easier to make.

The Y counter cycles for counts of 0 to 23 every data strip. Synchronization is done by omitting or adding one count per cycle of 24 steps. If greater speed tolerance is required, the algorithm can be extended to correct by adding or subtracting 2 counts in 24. There are upper and lower Y counters maintained by microprocessor 74 in memory 75. Scanning is initiated by the upper Y counter.

The upper and lower Z counters contain 16 bits of which the low order 3 are the 8 steps within a data strip and the upper 13 identify the data strip on a card. There will be about 7,000 data strips, 11 microns wide, in an 85 mm. long film strip.

The Z counters' low order three bits must be set to zero at the leading edge of a data strip in order to hold the identification constant across the data strip.

The Y counter is set to zero at the middle of the data strip (when low order Z counter bits are 100 binary). This simplifies scan initiation. Scans 0, 1 and 2 occur at counts 0, 8 and 16 of the Y counter, respectively. The relationship must be maintained and whenever the Y count goes to zero, the microprocessor should test the corresponding (upper or lower) Z counter's low order 3 bits to ensure that they equal a count of 4 (i.e., 100 binary).

In order to establish a correct data strip count for each end of the scan, the data strip sync marks of the delimiter bands are used first to get a counter locked in with the data strip positions and then the gross position band is used. When the width of the gross position band transitions, the three low order data strip count bits (bits 3 to 5 in the Z counters) are also zeroed. The width of the gross position band before and after the transition uniquely determines the next higher 3 bits (bits 6 to 8) of the data strip counts (Z counters). The lower 3 bits of the data strip counts (bits 3 to 5 in the Z counters) are controlled by counting data strips as they are detected by the sinusoidal data strip sync marks within the delimiter bands 61 and 66. Having the 8 data strip granularity of the gross position band allows the position to be determined unambiguously while still allowing for a maximum skew of 0.7 degrees between the read scan line and the recording path line. The higher order bits (bits 9 to 15) required for a full address of the data strip are derived from reading a data strip number encoded within the data strip itself. They need only be recorded in those data strips corresponding to a gross position indicator width transitions, if data capacity is important.

If the 7 to 0 transition of the gross position indicator falls between the desired value of the upper and lower Z counters, there is a possibility for error. It can be avoided by the following process. The data strip number should be recorded in the first data band. At the upper gross position band transition first observed, the bits 9–15 of the upper Z counter are loaded unless the transition is from 7 to 0 (i.e., 111–000 binary) in bits 6–8. In this case, wait until the next transition. When the next transition in the lower gross position is observed, insert the same bits 9–15 in the lower Z counter along with the indicated bits 6–8 derived from the lower gross position band. Now determine the difference between the upper and lower Z counters. Its magnitude must be less than a binary ONE in bit location 8 of the Z counters. If it is not, then the error is in bit 9 (the lowest bit derived from the data strip number encoded in the data) and 0000001000000000 (binary) must be added or subtracted to the lower Z counter to bring the difference within the limit.

The number of data strips required to settle down the position Z counters initially is 14 to 16 (8 data strips maximum for the gross position band to hit a width transition and about 8 data strip sync marks in the delimiter band). The data strip upper and lower Z counters are kept in the memory 75 and incremented by microprocessor 74 in response to interrupt I4 from divide by 3 logic 84.

Signals derived from 8 kilohertz clock 76 are used to generate interrupts to microprocessor 74 which in turn initiates scans of the CCD scanner 73 and incrementing of the Z counters stored in memory 75. The 8 KHZ frequency from clock 76 at the clock (C) input of logic 77 is divided by 8 by divided by 8 logic 77 to produce interrupt I2 to microprocessor 74 at a 1 KHZ rate. In response to interrupt I2, microprocessor 74 outputs command C1 which sets scan flip-flop 78 which initiates a scan of CCD scanner 73 at a 1 KHZ frequency which results in 3 scans per data strip. Flip-flop 78 is reset by a scan complete signal at its R input from CCD scanner 73. As described below, command C3 from microprocessor 74 at the reset (R) input of divide by 8 logic 77 is used during the initial state in order to synchronize the Y counter with the maximum amplitude (width) of the data strip sync marks of upper delimiter band 61. The Y counter is kept in memory 75 and is incremented by microprocessor 74 in response to interrupt I3 which comes directly from 8 KHZ clock 76. The Y counter counts from 0 to 23 (i.e., 24 steps within a data strip) and used during the initial state to determine where the 3 scans within a data strip should be triggered. In the steady state, interrupt I2 from divide by 8 logic 77 is used to keep track of which scan is being performed (i.e., scan 0, scan 1, or scan 2).

A second signal derived from 8 KHZ clock 76 comes from divide by 3 logic 84 as interrupt I4. Interrupt I4 is used by microprocessor 74 to increment the upper and lower Z counters 8 times per data strip thereby providing the Z counters with a resolution of ⅛ data strip. As will be seen, the Z counter is used to decide which data bands of a scan contain good data during the steady state reading of the data after synchronization has been established during the initial state. The counter within divide by 3 logic 84 is reset to zero by command C2 from microprocessor 74 during the initial state to synchornize the Z counters with the Y counter at the time the Y counter is synchronized with the maximum amplitude of the data strip sync marks of the upper delimiter band 61.

As will be described below, during the steady state, command C5 from microprocessor 74 is used to block 1 count from 8 KHZ clock 76 and command C4 from microprocessor 74 is used to add an additional count from 8 KHZ clock 76. Command C5 blocks 1 count by setting block 1 flip-flop 87 which, when set, partially disables AND gate 89 thereby inhibiting the signal from 8 KHZ clock 76. Flip-flop 88 is reset by the blocked count and thereafter enables AND gate 87 to pass subsequent counts until flip-flop 88 is once again set. Command C4 adds a count by allowing the microprocessors to inject a single count through the second input of OR gate 90, the output of which goes to both logic 77 and logic 84.

The correspondence of the Z and Y counters during the intial state (synchronization) and steady states (reading data) is shown in FIG. 8.

The Y counter is reset after each cycle (data strip). It is used for synchronization and scan control. The main counter for data strip number is the Z counter which is derived from the Y counter. The Z counter has 8 steps per data strip which are used in calculating effective scan position at each data bands. There is an upper and lower Z counter.

The Z counter is set when the first transition of the gross position band occurs. This will set the bits 6–8. Higher bits are based on reading data strip numbers from the data encoded within the data strip itself.

After initialization, during data readings there are two Z counters running which measure the upper and lower position of the scan line. If there is no skew, there will be no difference between the upper and lower Z counter counts. The optimum condition for reading is when the lower 3 bits indicate the scanner is close to the data strip center (i.e., 100 binary) and reading should be error free for counts between 2 and 5 (i.e., 010 and 101 binary).

If there is a difference, then optimum reading points will be different in each band. An effective count for a band can be simply developed.

For the $n^{th}$ band out of 30, because of the sync bars of sync band 63, its effective position is $n+1$.

There are 32 steps from the upper delimiter band 61 track to the middle of the first data band, to the middle of successor data bands and finally to the lower delimiter band 66.

Therefore effective Z count at at $n^{th}$ data band of a data strip is:

$$Z \text{ for band } n = Z \text{ upper} + ((n+1)/32)^*(Z \text{ lower} - Z \text{ upper})$$

By choosing the number of data bands in a data strip to be 2 raised to an integer power minus 2 (i.e., $2^n - 2$), this arithmetic is simplified but any band count is feasible. In the preferred embodiment, n is 5 yielding 30 data bands in a data strip. The calculation is carried out to one eighth of a data strip (i.e., 3 binary bits below the data strip number).

Data read out from a data band of a data strip is considered good and therefore stored in memory 75 if its effective Z count is between 2 and 5 in the lowest three bits (i.e., bits 0–2).

The other requirement for good data is that the error detection codes are valid. The 44 bits per data band allow for transverse and longitudinal parity on a byte basis providing good protection against errors which are concentrated at the ends of the data bands in the data strip. An error detection and correction code and byte parity is another possibility. There are many other codes which should give adequate protection. The two direction parity was chosen because it is simple to work with.

If two good reads, as determined by effective Z counts and parity bits, are obtained from a data band within a data strip, they simply overwrite one another in memory 75.

The location in memory 75 for storing the 4 bytes from a band is determined by the upper bits of the effective Z count (i.e., all but the lower 3 bits which are used for read validation).

The use of the Y and Z counters during the initial and steady states is shown in FIG. 8. When the movement of the card reaches the approximate location of the record required (determined by counting cycles of the gross position delimiter), the card is slowed from the fast seek speed to the slower reading speed. At this point, the data strip synchronization process (initial state) starts.

The Y, upper Z and lower Z counters are set to zero and a scan is triggered. In order to have a valid value for the maximum and minimum of the counts as the sinusoidal wave shape of the upper delimiter band 61 is traversed, a special scan sequence is invoked. This is desirable because the CCD element size and the shape of the delimiter interact and counts may vary a little. The procedure is to scan 3 times over one data strip width and then shift a half scan interval ahead (by adding a count of four extra to the Y counter) in order to sample at intermediate points over the second data strip. Six equally spaced samples, which will come within 4% of the peaks at worst case, is good enough. The six samples have to be taken over two cycles of the Y counter (i.e., two data strips) because of scan speed limitations of the CCD scanner 73.

The maximum X value from the six scans is then selected and its corresponding Y count within its data strip is determined based on whether scan 0, 1, 2, 3, 4 or 5 had the maximum X count. An algorithm is used to determine what the Y count for the 0 scan position should have been. A simple linear approximation is used, based on the magnitude of the neighboring scans across the data strip sync marker. If the scan with the largest X value is scan N, the formula for the adjustment (A) to the Y count is:

$$A = ((X(N+1) - X(N-1))/(X(MAX) - X(MIN)))*5$$

where:
X(MAX) is the scan with the maximum X value
X(MIN) is the scan with the minimum X value
X(N+1) is the scan to the right of X(MAX)
X(N−1) is the scan to the left of X(MAX)
And where the scans 0 to 5 are ordered from left to right by their Y count values which means they they are given an order of scan 0, 3, 1, 4, 2, 5 followed by scan 0 again to provide left and right neighbors for scan 0 to 5.

In order to trigger scan 0 to read the maximum X count (which occurs at the center of a data strip), the Y counter must be adjusted by subtracting A (rounded to the nearest integer), the adjustment count, from the Y counter.

This adjustment procedure is based on having the scan 0 fall at the maximum (peak) of the sinusoidal wave of the upper delimiter band 61. This must correspond to the center of a data strip. The Y count cycles from 0 to 23 every data strip from the start of this synchronization process and the next time the desired scan 0 position is reached can be determined by comparison with Y(N)-A. When this point is reached, the Y counter is set to zero and a steady state process used during the reading of data takes over.

During the steady state process, when data is being read, the Y counter, and upper and lower Z counters, are adjusted as needed to keep their values synchronized with the maximum X value for the width of upper delimiter band 61. This adjusting of the Y and Z counters during steady state is done by comparing the magnitudes of the X count of scan 1 of the current cycle with the X count of scan 2 of the previous cycle after scan 1 of the current cycle occurs. If the X values of the scans differ by one or less, no adjustment to the Y and Z counters is needed. If the X value difference is greater than or equal to +2, one count is added by microprocessor command C4. If the X value difference is less than or equal to −2, one count is subtracted by blocking one clock pulse by use of microprocessor command C5.

The above use and adjustment of the Y counter is based on the more or less constant speed motion of the data card under the CCD scanner and having approximately 24 Y counts per data strip.

The clocking signal from 8 kilohertz clock 76 is divided by 8 by logic 77 to create an interrupt I2 which is used to initiate a scan. Interrupt I4 causes microprocessor 74 to send a command C1 to the CCD scanner 73 to transfer data from the light sensitive elements to the shift register within it and starts shifting data out. The rate at which data is shifted out of the CCD scanner 73 is controlled by the 5.25 MHZ oscillator 71 via clock signal generator 72. The command C1 sets scan flip-flop 78 after which the clocking signal for the shift register is allowed into the CCD scanner 73 and clocks the data out of the data out port.

When reading data normally (i.e., during the steady state), the data from the CCD scanner 73 goes into modified frequency modulation logic 86 where it is processed in the same manner that signals from magnetic tape are processed. The data stream is processed against a modified frequency modulated clock and detector and error detection processing is done in logic 86. These are standard state-of-the-art techniques and need not be discussed for purposes of the present invention. The data stream, as processed by MFM logic 86, is stored in memory 75 in a buffer. Individual data bands are then moved to data strip buffers in memory 75 under microprocessor 74 control depending on whether or not the skew calculation (effective Z count) indicates that when the data band was read, the scanner was positioned within the data band of the data strip in a zone that will produce valid data and there was no parity errors.

As described previously, the 5.25 megahertz oscillator 71 provides counts which are used to measure the width of the synchronizing delimiting bands at the upper and lower edges of the data strip. When AND gate 79 is enabled, X counter 80 of 6 bits accumulates a count and equal 8 logic 92 is used to detect if the count exceeds eight which indicates that a relatively broad band has been encountered, which only occurs in the upper and lower edge bands. The enabling of AND gate 79 is caused by the leading edge detector 81, which sets flip-flop 83. Trailing edge detector 82 resets flip-flop 83. This process continues for smaller blocks of data that occur in the data area of the card, but only if X can reach 8 does interrupt I1 occur indicating that an X count needed for synchronizing have occurred. Those counts are read out of X counter 80 and handled by the microprocessor 74 in the process that is described for pulling in the synchronization and establishing counts for distance along the card at the upper and lower edges of the optical recording strip of the card. Clock 76 and divide by 8 logic 77 provides the basic 1 kilohertz rate of interrupt I2 to set off data strip scans. The clock is also divided by three by logic 84 to provide interrupt I4, which is ⅓ of a full cycle of the sinusoidal wave of a single data strip in the upper delimiter band 61 along the top of the optical recording strip. Interrupt I4 is used by microprocessor 74 for processing the various things that are done in order to sync the Z counters which are maintained by the microprocessor 74 to track the ends of the read scan line in terms of data strip counts along the top and bottom of the optical recording strip.

The CCD scanner 73 creates an analog wave form. The CCDs have the capability to store analog quantities and as they are shifted along by the 5.25 megahertz oscillator 71 via clock signal generator 72, they are put together in a output circuit and the output wave form is an analog wave form such as seen from magnetic tape. The process of extracting data from the analog wave form does not make us of the 5.25 megahertz oscillator 71, but instead is controlled by a clock which is locked to the signals that it sees in the data. In order to get that clock started, 24 synchronizing bars are provided in the data strip in synchronizing band 63 before the first data band (see FIG. 6). The clock locks onto the synchronization bars and then is maintained by the transitions which take place in the data itself every 5.5 or 11 microns along a data strip. The response of the clock is sufficiently slow that if a few data elements are garbled it will not be disturbed. The clock will ride through those garbled data elements and pick up its control again with the good data element and transitions that come next.

The method of processing this analog data output signal from the CCD scanner is analogous to the manner in which the analog signal from a read head on magnetic tape is processed and transformed into digital data and will not be discussed further.

The following description summarizes a method for using the present invention to read a block of data within an optical card when starting from the beginning of the card film strip.

Initiate fast physical scan unless first data strip to be read is in first 512 data strips.

Scan every 8 counts of free running Y clock in response to interrupt I3.

Measure upper gross delimiter width only. There will be about 4 samples per gross delimiter cycle if moving the card at the fast positioning speed. Count gross delimiter cycles by detecting when $X(N+1)-X(N)$ goes positive after negative difference values.

Two gross delimiter cycles before the desired read location, change to slower read speed.

When the speed is close (motor control indication from the tachometer), start synchronization procedure. Do the 6 sample scans and set Y counter to 0 position. Change to stable sync (steady state) mode. If errors exceed 2 units in X, repeat initial sync procedure and then return to stable sync procedure.

Read upper and lower gross position indicators at transitions. Set bits 6-8 in both Z counters.

Read data strip number from data strip at Y=0 and set upper bits of Z counters if error detection indicates no error. Make test for excessive difference and correct, if necessary.

Initiate reading when the leading Z counter (whichever is most advanced) reaches the required data strip number.

Calculate effective Z for each data band. After reading a data strip, check effective Z for each data band. Lower 3 bits should be 2, 3, 4 or 5. Check error detector indicators. If correct, store data at address determined from bits 3-15 of effective Z.

Proceed until lagging Z counter reaches required data strip number. Data read out from memory can then start or can be delayed until read block is completely read (i.e., end of read address is exceeded by both Z counters).

Although the above description of the preferred embodiment of the invention has been in terms of performing the effective Z count calculations for each data band as the data strip data is processed based on the upper and lower Z counters for the scan, the effective Z count calculations could be done for each band beforehand and used to create tables which are referenced by the low 3 order bits of the upper Z counter, the difference between the upper and lower Z counters and the data band number. The referenced entry in the tables would then indicate whether or not the data for the data band in the data strip scan is in an error free zone.

The above description of the preferred embodiment is intended only to provide an example of the present invention which provides for skew compensation without alignment by providing a method of determining the skew between the recording path line and the read scan line and then using the skew to determine which of multiple reads of the data has produced good data.

Although the preferred embodiment has been described primarily in terms of a data card, the invention is equally applicable to a linear tape or could be used in a disc with the delimiter bands being layed down as concentric circles with data bands being recorded as concentric circles between the delimiter bands.

Although the above discussion has been in terms of optical recording and reading, the present invention is equally applicable to other recording methods, such as magnetic recording, in which skew can occur between the recording path line and the read scan line.

Although the preferred embodiment has been described in terms of a data band having 32 data bits, 4 transverse parity bits and 8 longitudinal parity bits for a total of 44 bits other combinations having greater or lesser data bits and parity bits may be used. Further, an error detection and correction scheme may be usefully employed. Also, it may be desirable to add a marker between some or all of the data bands in order to more positively identify the limits of the data bands.

While the invention has been shown and described with reference to the preferred embodiment thereof, it will be understood by those skilled in the art that the above and other changes in form and detail may be made therein without deparing from the spirit and scope of the invention.

What is claimed is:

1. A method for skew compensation comprising the steps of:
   A. recording data in data strips that are more or less perpendicular to the lengthwise axis of the recording media;
   B. scanning the data transversely with a scanner at a rate sufficient for the worst case rate of the recording media relative to the read scan line;
   C. determining the position of both ends of the read scan line by counting delimiter marks along the two edges of the data being read (scanned) which are spacially related to the data strips and have an accuracy equal to or less than ½ of a data strip, the difference between the counts proving a measurement of the skew;
   D. dividing the data into bands along the direction of scan within which the skew will not cause troublesome misreadings of the extreme bits of the read scan line within a band;
   E. scanning the scanned data a plurality of times during the transition of the data strip; and
   F. determining which bands of a scan are centered well enough for correct read out is determined by the difference of the delimiter mark counts at the two ends of the read scan line.

2. The method of claim 1 wherein the scanning of the data is done by use of a CCD scanner.

3. The method of claim 1 wherein the determining of which bands of a scan are centered well enough for a correct reading is a verified by use of error detection codes recording in the data within the bands.

4. The method of claim 1 wherein the scanning of sequential data strips is done by moving the recording media under a fixed reader.

5. The method of claim 1 wherein the scanning of sequential data strips is so done by moving the reader over the fixed recording media.

6. The method of claim 1 wherein each data strip is scanned three times in order to provide at least one good read of a data band.

7. The method of claim 1 wherein the delimiter marks at each end of the data strip have a periodic shape on each edge such that the amplitude varies from a minimum to a maximum once in each data strip.

8. The method of claim 1 wherein a position band is a record at each end of a data strip which indicates the gross position of the ends of the scan line.

9. The method of claim 8 wherein the particular data strip within a gross position is determined by counting data strips after the change in gross position is detected.

10. The method of claim 1 wherein the good reading of bands is determined by using a calculation based on the relative position of the bands in the traverse scan line and the difference between the positions of the ends of the scan line.

11. The method of claim 1 wherein the good reading of bands is determined by using a prestored table based on the difference between the position of the ends of the scan line.

12. Apparatus for skew compensation comprising:

A. means for recording data in data strips that are more or less perpendicular to the lengthwise axis of the recording media;

B. means for scanning the data transversely with a scanner at a rate sufficient for the worst case rate of the recording media relative to the read scan line;

C. means for determining the position of both ends of the read scan line by counting delimiter marks along the two edges of the data being read (scanned) which are spacially related to the data strips and have an accuracy equal to or less than ½ of a data strip, the difference between the counts proving a measurement of the skew;

D. means for dividing the data into bands along the direction of scan within which the skew will not cause troublesome misreadings of the extreme bits of the read scan line within a band;

E. means for scanning the scanned data a plurality of times during the transition of the data strip; and F. means for determining which bands of a scan are centered well enough for correct read out is determined by the difference of the delimiter mark counts at the two ends of the read scan line.

* * * * *